US006208127B1

(12) United States Patent
Doluca

(10) Patent No.: US 6,208,127 B1
(45) Date of Patent: Mar. 27, 2001

(54) METHODS AND APPARATUS TO PREDICTABLY CHANGE THE OUTPUT VOLTAGE OF REGULATORS

(75) Inventor: Tunç Doluca, Saratoga, CA (US)

(73) Assignee: Maxim Integrated Products, Inc., Sunnyvale, CA (US)

(*) Notice: Subject to any disclaimer, the term of this patent is extended or adjusted under 35 U.S.C. 154(b) by 0 days.

(21) Appl. No.: 09/431,326

(22) Filed: Nov. 2, 1999

(51) Int. Cl.[7] .................................................... G05B 24/02
(52) U.S. Cl. ............................................ 323/349; 323/351
(58) Field of Search ..................................... 323/283, 351, 323/349, 222; 364/528.22

(56) References Cited

U.S. PATENT DOCUMENTS 4,893,228 * 1/1990 Orrick et al. ........................ 323/351
5,905,370 * 5/1999 Bryson ................................ 323/351
5,969,515 * 10/1999 Oglesbee ............................. 323/351

* cited by examiner

*Primary Examiner*—Shawn Riley
(74) *Attorney, Agent, or Firm*—Blakely, Sokoloff, Taylor & Zafman LLP

(57) ABSTRACT

Programmable voltage regulators that change from a first set-point voltage to a second set-point voltage at a controlled rate. The set-point signal is a multi-bit set-point signal with the rate of change in the regulator output between set-points being predetermined or externally controllable. Various embodiments are disclosed.

52 Claims, 3 Drawing Sheets

METHODS AND APPARATUS TO PREDICTABLY CHANGE THE OUTPUT VOLTAGE OF REGULATORS

BACKGROUND OF THE INVENTION

1. Field of the Invention

The present invention relates to the field of power supplies and, more particularly, to programmable power supplies.

2. Background Information

Voltage regulators are used to provide a controlled, stable output voltage to a load. A voltage regulator receives power from an unregulated power source and provides power to a load at a predetermined output voltage. A typical regulator includes a control circuit that compares a reference voltage with a feedback voltage proportional to the output voltage from the regulator to develop an error signal, with the control circuit controlling the regulator to provide more or less current to the load to reduce the error signal, thereby forming a closed loop system. Such regulators may be of any of various types, such as linear regulators and switching regulators, including step-up and step-down switching regulators.

Programmable voltage regulators are used to provide output voltages that can be set to provide the output voltage required. Digitally programmable voltage regulators are set by digital signal values that represent the desired output voltages. The MAX1638 high-speed step-down controller with synchronous rectification for CPU power, manufactured by Maxim Integrated Products, is an example of a digitally programmable voltage regulator that provides output voltage levels set by received digital values.

In a typical application, a programmed increase in the output voltage of the programmable regulator results in a momentarily high current drain from the power source supplying power to the digitally programmable voltage regulator. Some power sources, such as batteries, have relatively high internal impedance and thus are not able to supply a load current substantially higher than the normal range of load currents, even for a brief period. The voltage of such a power source can drop momentarily to a low level when the power source is subjected to the high current drain from supplying power to the digitally programmable voltage regulator whenever the set-point voltage is increased.

SUMMARY OF THE INVENTION

Programmable voltage regulators that change from a first set-point voltage to a second set-point voltage at a controlled rate. The set-point signal is a multi-bit set-point signal with the rate of change in the regulator output between set-points being predetermined or externally controllable. Various embodiments are disclosed.

DETAILED DESCRIPTION

Figure 1:
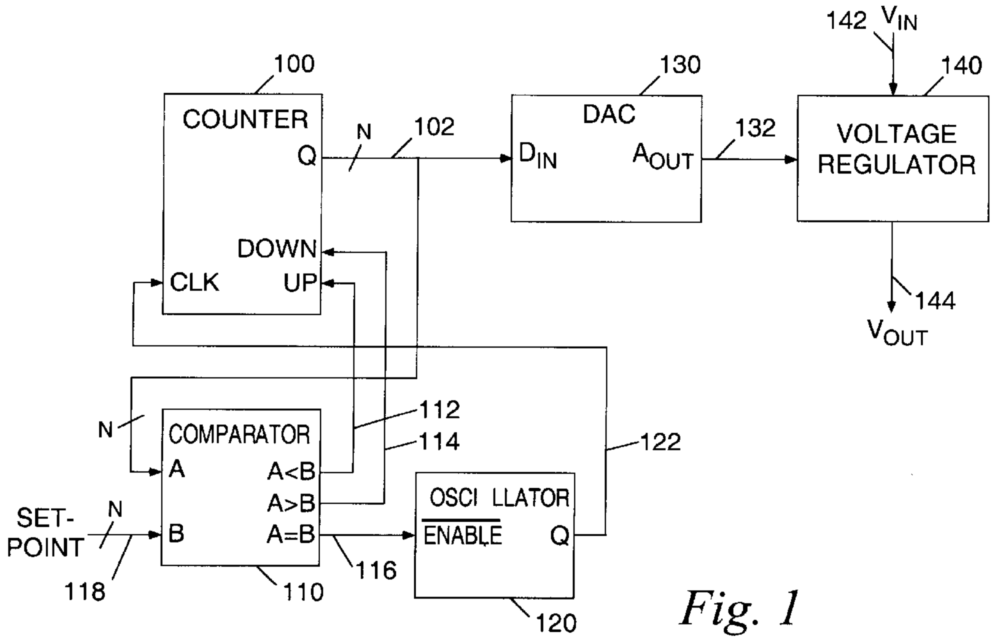
FIG. 1 is a block diagram of a voltage regulator incorporating one embodiment of the invention.

FIG. 1 is a block diagram of a voltage regulator incorporating one embodiment of the invention. The voltage regulator 140, which may be a linear or switching regulator providing step-up or step-down voltage regulation or may be another form of voltage regulator as is well known in the art, receives a set-point control signal 132 that sets a desired output voltage to be provided by the voltage regulator 140. The set-point signal 132 may be coupled to supply a reference voltage to the voltage regulator, or may be coupled to a feedback loop of the voltage regulator or may be otherwise coupled to control the set-point voltage of the voltage regulator as is well known in the art.

The phrase set-point voltage, as used herein, is the desired steady state output voltage to be provided by the voltage regulator. The control circuit within the voltage regulator 140 operates to adjust the output current so that the output voltage will be substantially the same as, proportional to, or a predefined function of the set-point voltage. The output voltage may momentarily decrease if the load on the voltage regulator 140 is increased, and may momentarily increase if the load decreases. The control circuit within the regulator operates to adjust the output current in response to changes in the output voltage to return the output voltage to the set-point, in the case of the circuit of FIG. 1, as determined by the control signal 132.

A voltage programming circuit, comprised of a counter 100, a digital comparator 110, an oscillator 120 and a digital to analog converter (DAC) 130, generates the control signal 132 that controls the set-point voltage of the voltage regulator 140. The voltage programming circuit receives a digital set-point value 118, comprising N bits (preferably parallel bits, but possibly serial bits) that represent the desired set-point voltage, as one input of the digital comparator 110. The N bit output 102 of counter 100 is coupled as a second input of the digital comparator 110. The oscillator 120, when enabled by the comparator 110 ($\overline{\text{ENABLE}}$ low), provides a clock signal at a predetermined frequency on line 122 coupled to the clock input of the counter 100.

The digital comparator 110 provides output signals based on a comparison of the set-point value 118 and the counter output 102. If the count output 102 is equal to the set-point value 118, the digital comparator 110 generates an equal signal (A=B) 116 that is coupled to the oscillator 120 to disable ($\overline{\text{ENABLE}}$ high) the oscillator and cause the counter output 102 to be held at the present set-point value 118. If the count output 102 is less than the set-point value 118, the digital comparator 110 will provide a less than (A<B) signal 112 to the counter 100. At this time, the equal signal (A=B) will be low to enable ($\overline{\text{ENABLE}}$ low) the oscillator 120 to cause the counter output 102 to be incremented at a rate determined by the frequency of oscillation of the oscillator. If the count output 102 is greater than the set-point value 118, the digital comparator 110 generates a greater than (A>B) signal 114, the equal signal (A=B) again being low to enable ($\overline{\text{ENABLE}}$ low) the oscillator 120 to decrement the counter at a rate determined by the frequency of oscillation of the oscillator.

In this way, the counter 100 counts to a first set-point value 118 and holds that value. When a second set-point value 118 is received by the digital comparator 110, the counter 100 provides an incremental sequence of digital values as the count output 102, beginning with the first set-point value 118, ending with the second set-point value 118, and preferably including all intermediate values. The sequence of digital values is produced at a rate proportional to the frequency output 122 of the oscillator 120 as supplied to the counter 100.

The sequence of digital values generated as the count output 102 by the counter 100 is coupled to digital to analog converter (DAC) 130. The DAC 130 provides an analog output 132 proportional to or monotonic with the digital input to the DAC. The analog output 132 is coupled to the voltage regulator 140 as the signal that directly or indirectly controls the voltage regulator. The operation of the voltage programming circuit causes the program signal 132 provided by the DAC 130 to change in response to step changes in set-point values 118 at a limited rate controlled by the frequency output 122 of the oscillator 120. The output voltage produced by the voltage regulator 140 is thereby caused to be substantially proportional to any steady state set-point value 118, and be responsive to step changes in the set-point value 118 with a rate controlled by the frequency of the output 122 of the oscillator 120 to limit the inrush of current from the power supply as may otherwise be required to rapidly increase the regulator load voltage. Preferably, the rate of change in the regulator output commanded by the voltage programming circuit is somewhat slower than the response of the regulator so that the regulator may reasonably well follow the rate of change without itself injecting large transients into the system.

Figure 2:
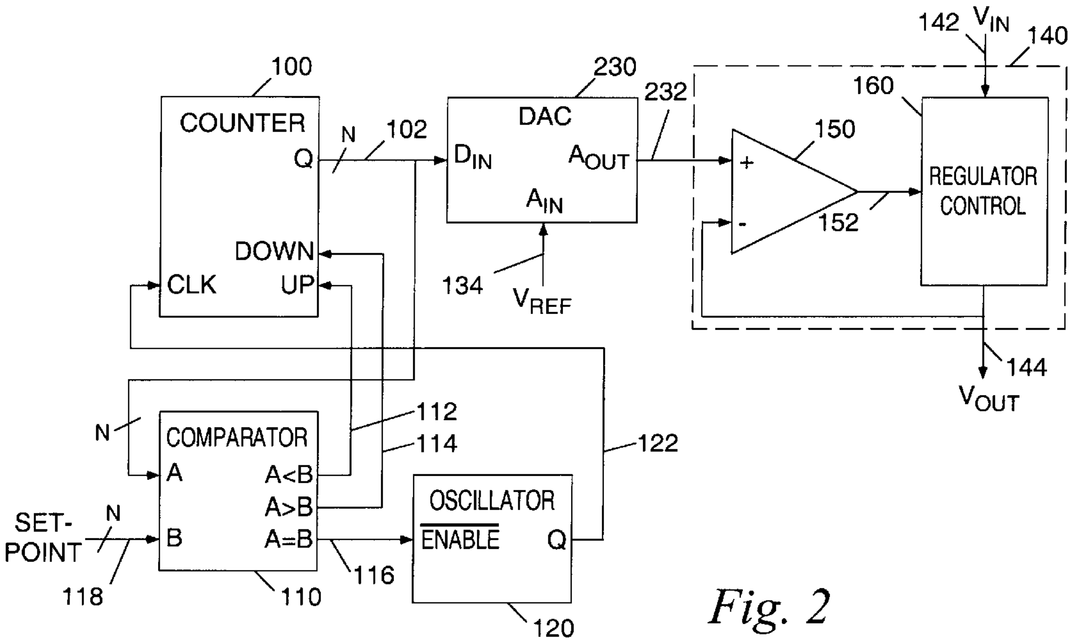
FIG. 2 is a block diagram of a voltage regulator incorporating another embodiment of the invention.

FIG. 2 is a block diagram of one typical embodiment of the invention. The voltage regulator 140 comprises an analog comparator or error amplifier 150 which receives the program signal 232 and a feedback signal from the regulator output 144 to provide a control signal 152 for the regulator control 160. The phrase "analog comparator" as used herein is used in the general sense and includes control amplifiers as appropriate for the particular regulator being used.

The counter 100, digital comparator 110 and oscillator 120 operate as described above to provide count output 102 responsive to the set-point values 118. A DAC 230 receives the count output 102 and a reference voltage 134 and produces the program signal 232 as an analog voltage proportional to, monotonic with, or a predefined function of the count output 102 and the reference voltage 134. When the set-point value 118 is changed from a first set-point value to a second set-point value, the counter 100, the digital comparator 110, the oscillator 120 and the DAC 130 operate such that the analog voltage 144 changes from a value defined by the first set-point value to a value defined by the second set-point value at a rate determined by the frequency output 122 of the oscillator 120. In practice, in this and in the other circuits herein, the analog comparator 150 may receive a signal proportional to the output 144 as the feedback signal, and may further comprise additional inputs (not shown) such as are well known in the art for response to other control parameters.

Figure 3:
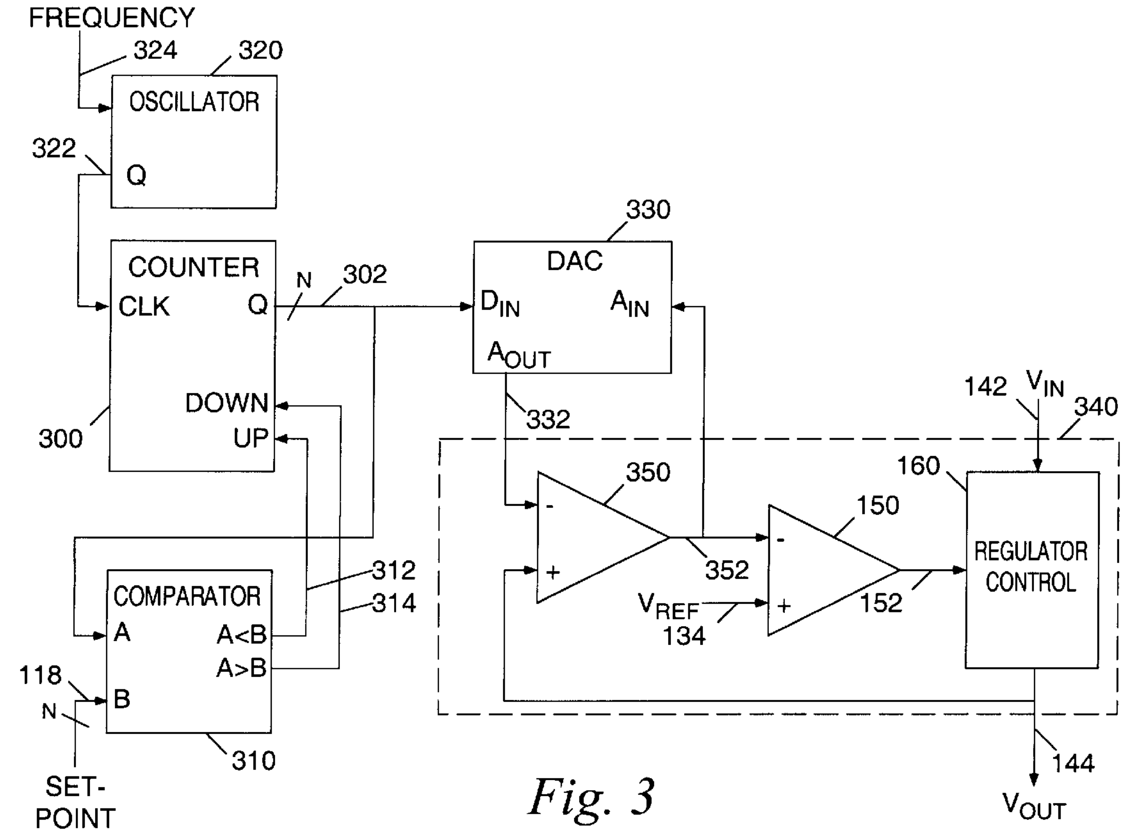
FIG. 3 is a block diagram incorporating another embodiment of the invention.

FIG. 3 is a block diagram of another typical embodiment of the invention. In this embodiment, the oscillator 320 of the voltage programming circuit is always enabled. The frequency of the oscillator is controlled by an externally provided frequency control signal 324 (which, for example, could be a frequency control parameter set by an external component, a controllable frequency control signal, the desired frequency itself, or a frequency proportional to the desired frequency) to provide a programmable rate of change for the output voltage 144 and allow the transition time to be selected based on the amount of inrush current that can be safely tolerated. The counter 300 is unaffected by the clock input and holds the count when neither the greater than (A>B) signal 314 nor the less than (A<B) signal 312 is asserted. If the clock frequency or a frequency proportional to the desired frequency is externally provided, the oscillator will be eliminated. The voltage programming circuit otherwise operates as described above to provide count output 302 responsive to the set-point values 118.

A DAC 330 receives the incremental counter output 302 and produces a program signal 332. The DAC 330 is placed in a feedback attenuation/amplification section of the voltage regulator 340. The feedback attenuation/amplification section comprises an op amp 350 that receives a feedback signal from the regulator output 144 and the program signal 332, and produces an output voltage 352 in response to the count output 302 and the regulator output 144. The analog comparator 150 receives the op amp output voltage 352 and the reference voltage 134 to provide a control signal 152 for the regulator control. This embodiment otherwise operates as described above to provide an adjustable analog voltage 144 that responds to changes in the set-point value at a controlled rate.

Figure 4:
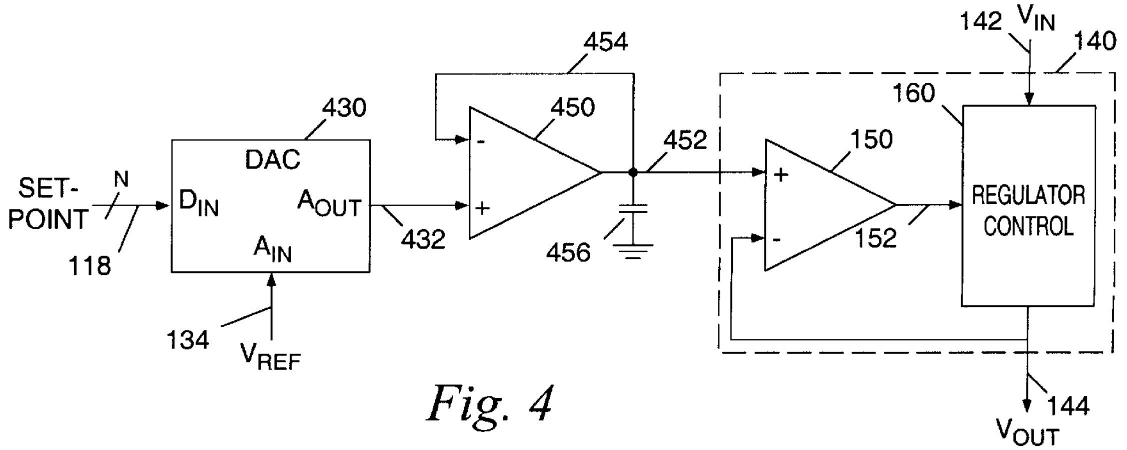
FIG. 4 is a block diagram incorporating another embodiment of the invention.

FIG. 4 shows a block diagram of a voltage regulator incorporating another embodiment of the invention. The voltage regulator 140 comprises an analog comparator 150, which receives the program signal 452 to control the set-point voltage, and the remaining circuits 160 of the voltage regulator 140. The voltage regulator 140 receives unregulated power 142 and supplies regulated power 144 in response to the program signal 452.

The voltage programming circuit is comprised of a digital to analog converter (DAC) 430, an op-amp 450, and a capacitor 456. The set-point values 118 are supplied to the DAC 430 as a digital input. The DAC 430 receives a reference voltage 134 as an analog input. As a result, the DAC 430 generates an analog output 432 that is responsive to the reference voltage 134 and the set-point value 118. The analog output 432 is supplied to a ramp generator comprised of an op-amp 450 and a capacitor 456. The capacitor 456, together with the output impedance of the amplifier, provides the rate value for the circuit. When the set-point value 118 is changed from a first set-point value to a second set-point value, the DAC 430 and the ramp generator operate to provide the program signal 452 as the output of the op-amp 450 that changes from a value responsive to the first set-point value to a value responsive to the second set-point value at a rate determined by the capacitor 456. In another embodiment (not shown), the set-point values may be supplied as analog voltage inputs to the ramp generator. Slew rate limiting of the DAC can also be used in the embodiments shown in FIGS. 1 and 2 to smooth out the granularity caused by the discreet DAC steps.

The program signal 452 is compared to the output voltage 144 by the analog comparator 150 to generate the error signal 152 that is supplied to the remaining circuits 160 of the voltage regulator 140 to adjust the level of the output voltage 144. In this way, a closed loop system is created to regulate the output voltage 144. When the set-point value 118 is changed from a first set-point value to a second set-point value, the output 452 of the op-amp 450 causes the output voltage 144 to change from a value responsive to the first set-point value to a value responsive to the second set-point value at a rate determined by the rate value, determined by the capacitor 456 of the ramp generator.

Figure 5:
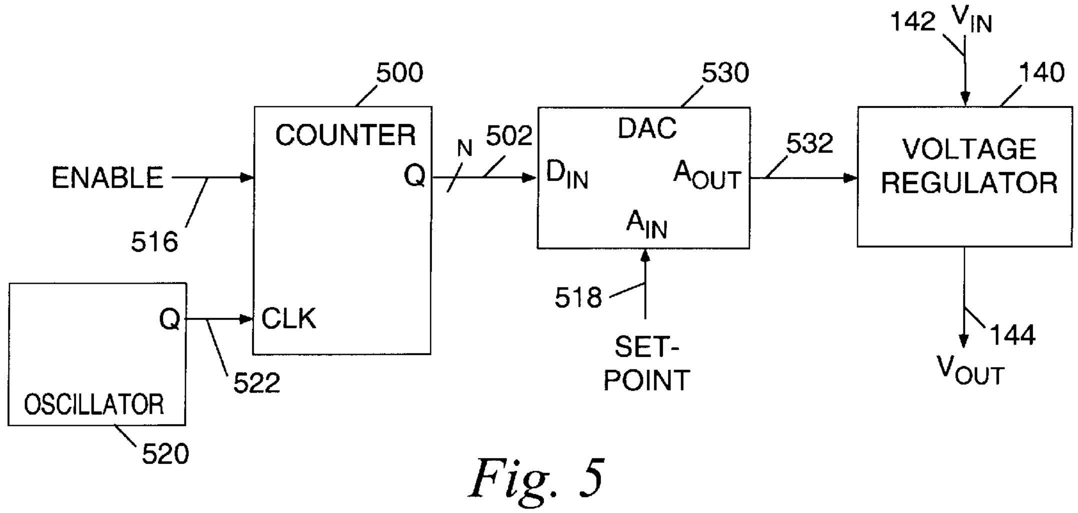
FIG. 5 is a block diagram incorporating another embodiment of the invention.

FIG. 5 shows a block diagram of a voltage regulator incorporating another embodiment of the invention adapted to provided a controlled voltage increase at powerup. The counter 500 is an up counter that is held at a minimum count, typically zero, when the enable signal 516 is not asserted. When enable is asserted, the counter counts clock signals 522 provided by an oscillator 520 up to a maximum value, typically an all ones value. The counter holds the maximum value without rolling over to the minimum value. The counter output value 502 is converted to an analog signal 532 by a digital to analog converter (DAC) 530. In one embodiment the DAC is a multiplying DAC that further receives an analog set-point signal 518 and produces an analog signal 532 that is proportional to the product of the counter output value and the set-point signal. The voltage regulator 140 is controlled by the analog signal. The enable signal may be asserted as part of a power-up sequence and the present invention can provide a controlled voltage ramp up. It will be appreciated that the counter could also be a down counter and the count could go from maximum to minimum in other embodiments of the present invention.

While certain exemplary embodiments have been described and shown in the accompanying drawings, numerous other variations and alternate embodiments will occur to those skilled in the art without departing from the spirit and scope of the invention. For example, the set-point value may be fixed to provide a fixed output voltage with a controlled ramp time from an off-state. Such an embodiment can employ a unidirectional up counter. Also, a counter may be made responsive to the difference between the set-point value and the current count by increasing the clock rate or counting by more than single units when the difference is large. In addition, the invention can be used for any type of regulator, including linear regulators and switch-mode regulators, in any topology, including step-down and step-up configurations. It is to be understood that such embodiments are merely illustrative of and not restrictive on the broad invention. Accordingly, it is intended that this invention not be limited to the specific constructions and arrangements shown and described for illustrative purposes, and that the invention be limited only in terms of the appended claims.

What is claimed is:

1. A programmable regulator comprising:

a counter having a first counter input coupled to a clock signal, and a counter output that counts toward a digital set-point;

a converter having a digital input coupled to the counter output, and an analog output that produces a signal responsive to the digital input; and, a regulating device receiving the analog output and providing a regulator output voltage responsive to the analog output, the regulator output voltage determined by the digital set-point with a rate of change determined by a frequency of the clock signal.

2. The programmable regulator of claim 1 wherein the counter output counts from a minimum value to a maximum value when the counter is enabled.

3. The programmable regulator of claim 1, the converter further having an analog input coupled to an analog set-point signal, and the analog output further responsive to the analog input.

4. The programmable regulator of claim 1 further comprising a digital comparator having a first comparator input, a second comparator input, and a comparator output, said first comparator input receiving a digital set-point signal, said second comparator input coupled to the counter output, and said comparator output coupled to the first counter input to enable counting in one of an up direction and a down direction responsive to a difference between the digital set-point signal and the counter output.

5. The programmable regulator of claim 1 wherein the converter is an digital to analog converter.

6. The programmable regulator of claim 1 wherein the digital to analog converter is a multiplying digital to analog converter.

7. The programmable regulator of claim 1 further comprised of an oscillator having an oscillator output coupled to the second counter input to provide the clock signal thereto.

8. The programmable regulator of claim 1 wherein the regulator device is a switching regulator device.

9. The programmable regulator of claim 1 wherein the regulating device is a step-down regulator device.

10. The programmable regulator of claim 1 wherein the regulating device is a step-up regulator device.

11. The programmable regulator of claim 1 wherein the regulating device is a linear regulator device.

12. The programmable regulator of claim 1 wherein the regulating device is an inverting regulator device.

13. A programmable regulator comprising:

a digital to analog converter receiving a digital set-point signal and providing an analog output;

an integrator integrating the analog output to produce an integrator output; and, a regulating device receiving the integrator output and providing a regulator output voltage responsive to the integrator output.

14. The programmable regulator of claim 13 wherein the regulating device is a switching regulator device.

15. The programmable regulator of claim 13 wherein the regulating device is a step-down regulator device.

16. The programmable regulator of claim 13 wherein the regulating device is a step-up regulator device.

17. The programmable regulator of claim 13 wherein the regulating device is a linear regulator device.

18. The programmable regulator of claim 13 wherein the regulating device is an inverting regulator device.

19. A method of controlling an output of a regulator comprising;

counting a clock signal to produce a digital count that counts toward a digital set-point;

converting the digital count to an analog signal; and, controlling a regulating device with the analog signal to adjust the output of the regulator to a steady state value determined by the digital set-point with a rate of change for the output determined by a frequency of the clock signal.

20. The method of claim 19 further comprising receiving an analog set-point signal, wherein the output is further controlled with the analog set-point signal, and wherein the counting is from a minimum value to a maximum value when counting is enabled.

21. The method of claim 19 further comprising;

receiving the digital set-point; and comparing the digital set-point to the digital count and increasing or decreasing the digital count to reach the digital set-point.

22. The method of claim 19 wherein converting the digital count to the analog signal comprises converting the digital count to the analog signal with a digital to analog converter.

23. The method of claim 19 wherein converting the digital count to the analog signal comprises converting the digital count to the analog signal with a multiplying digital to analog converter.

24. The method of claim 21 wherein a difference between the digital set-point and the digital count is accumulated at the desired rate using a clocked counter.

25. The method of claim 21 wherein a difference between the digital set-point and the digital count is accumulated using a clocked up/down counter.

26. The method of claim 19 wherein controlling the regulating device with the analog signal comprises controlling a switching regulating device.

27. The method of claim 19 wherein controlling the regulating device with the analog signal comprises controlling a step-down regulating device.

28. The method of claim 19 wherein controlling the regulating device with the analog signal comprises controlling a step-up regulating device.

29. The method of claim 19 wherein controlling the regulating device with the analog signal comprises controlling a linear regulating device.

30. The method of claim 19 wherein controlling the regulating device with the analog signal comprises controlling an inverting regulating device.

31. A method of controlling a programmable regulator comprising:

providing a digital set-point signal;

converting the digital set-point signal to an analog signal;

limiting a rate of change of the analog signal; and controlling a regulating device responsive to the analog signal.

32. The method of claim 31 wherein controlling the regulating device comprises controlling a switching regulating device.

33. The method of claim 31 wherein controlling the regulating device comprises controlling a step-down regulating device.

34. The method of claim 31 wherein controlling the regulating device comprises controlling a step-up regulating device.

35. The method of claim 31 wherein controlling the regulating device comprises controlling a linear regulating device.

36. The method of claim 31 wherein controlling the regulating device comprises controlling an inverting regulating device.

37. A method of controlling an output of a regulator comprising;

providing a digital set-point value;

comparing the digital set-point value to a digital count;

incrementing the digital count if the digital count is less than the digital set-point value;

decrementing the digital count if the digital count is more than the digital set-point value;

controlling a regulating device with the digital count to adjust the output of the regulator to a steady state value determined by the digital set-point value with a rate of change for the output determined by a rate of change for the digital count.

38. The method of claim 37 wherein controlling the regulating device further comprises converting the digital count to an analog signal with a digital to analog converter and controlling the output of the regulating device with the analog signal.

39. The method of claim 38 wherein converting the digital count to an analog signal comprises converting the digital count to an analog signal with a multiplying digital to analog converter.

40. The method of claim 37 wherein the difference between the digital set-point value and digital count is accumulated using a clocked counter.

41. The method of claim 37 wherein a difference between the digital set-point value and digital count is accumulated using a clocked up/down counter.

42. The method of claim 38 wherein controlling the regulating device with the analog signal comprises controlling a switching regulating device.

43. The method of claim 38 wherein controlling the regulating device with the analog signal comprises controlling a step-down regulating device.

44. The method of claim 38 wherein controlling the regulating device with the analog signal comprises controlling a step-up regulating device.

45. The method of claim 38 wherein controlling the regulating device with the analog signal comprises controlling a linear regulating device.

46. The method of claim 38 wherein controlling the regulating device with the analog signal comprises controlling an inverting regulating device.

47. A method of controlling a programmable regulator comprising:

providing a digital set-point signal;

converting the digital set-point signal to an analog signal;

integrating the analog signal to produce a control signal; and, controlling a regulating device responsive to the control signal.

48. The method of claim 47 wherein controlling the regulating device comprises controlling a switching regulating device.

49. The method of claim 47 wherein controlling the regulating device comprises controlling a step-down regulating device.

50. The method of claim 47 wherein controlling the regulating device comprises controlling a step-up regulating device.

51. The method of claim 47 wherein controlling the regulating device comprises controlling a linear regulating device.

52. The method of claim 47 wherein controlling the regulating device comprises controlling an inverting regulating device.

* * * * *